US006602018B2

United States Patent
Feeny et al.

(10) Patent No.: US 6,602,018 B2
(45) Date of Patent: Aug. 5, 2003

(54) SQUEEGEE ASSEMBLY HAVING A NON-DESTRUCTIVE RELEASE MODE

(75) Inventors: Steven V. Feeny, Plymouth, MN (US); Daniel L. Joynt, Wyoming, MN (US)

(73) Assignee: Tennant Company, Minneapolis, MN (US)

(*) Notice: Subject to any disclaimer, the term of this patent is extended or adjusted under 35 U.S.C. 154(b) by 63 days.

(21) Appl. No.: 09/836,020

(22) Filed: Apr. 17, 2001

(65) Prior Publication Data

US 2002/0006307 A1 Jan. 17, 2002

Related U.S. Application Data

(60) Provisional application No. 60/197,641, filed on Apr. 17, 2000.

(51) Int. Cl.[7] .............................................. A47L 11/00
(52) U.S. Cl. ..................... 403/227; 403/224; 403/226; 15/49.1; 15/50.3; 15/51; 29/708
(58) Field of Search ................................. 403/220, 223, 403/224, 225, 226, 227; 15/401, 49.1, 50.2, 50.3, 51, 250.04, 250.452, 250.46, 180; 29/708

(56) References Cited

U.S. PATENT DOCUMENTS

| | | | |
|---|---|---|---|
| 1,871,918 A | 8/1932 | Rossman | |
| 1,958,658 A | 5/1934 | Engberg et al. | |
| 4,006,506 A | 2/1977 | Burgoon | 15/50 |
| 4,339,841 A | 7/1982 | Waldhauser | 15/359 |
| 4,363,152 A | 12/1982 | Karpanty | 15/98 |
| 4,483,041 A | 11/1984 | Waldhauser | 15/359 |
| 4,619,010 A | 10/1986 | Burgoon | 15/50 |
| 4,989,288 A | 2/1991 | Moore | 15/98 |
| 5,377,382 A | 1/1995 | Bores | 15/340.1 |
| 5,454,138 A | 10/1995 | Mondigo | 15/354 |
| 5,579,555 A | 12/1996 | Pearse | 15/320 |
| 5,673,450 A | 10/1997 | Briscoe | 15/49.1 |
| 5,706,547 A | 1/1998 | Kobayashi | 15/250.3 |
| 6,073,304 A | 6/2000 | Knowlton et al. | 15/401 |
| 6,108,859 A | 8/2000 | Burgoon | 15/320 |

*Primary Examiner*—Lynne H. Browne
*Assistant Examiner*—David E. Bochna
(74) *Attorney, Agent, or Firm*—Fulbright & Jaworski L.L.P.

(57) ABSTRACT

A wiper assembly for surface maintenance vehicles has a non-destructive failure mode when impacting stationary objects, or otherwise becoming subject to instantaneous or rapidly increasing resistance to forward movement, due to an improved mechanical coupling. The improved mechanical coupling for a wiper assembly absorbs some of the impact stresses imparted to the wiper assembly. Portions of each improved mechanical coupling designed to absorb the stress forces deforms most nearest the location of increasing resistance to forward movement, and may either become fully disconnected if the stress force reaches a threshold force value or recoils to the original mounting location after absorbing forces that are less that said threshold force value. The threshold value force at which a wiper assembly dislodges from its mounting location is designed to avoid damage to the wiper assembly, the articulated mounting member (if any), and the maintenance vehicle itself. The mechanical coupling provides independent range and precision of motion and mechanical tolerance with respect to discrete instantaneous forces affecting the wiper assembly so that the wiper blades exhibit an increased effectiveness in response to contact with diverse size obstacles present on, and obstacles adjacent to, a surface to be cleaned. The improved mechanical coupling utilizes a resilient, deformable member that adds a modicum of additional travel in response to stress forces imparted to a wiper assembly. Accordingly, the teaching of the present invention may be applied to previously manufactured surface maintenance equipment and vehicles in the form of retrofitted mechanical couplings, requiring modest engineering and re-installation efforts.

19 Claims, 10 Drawing Sheets

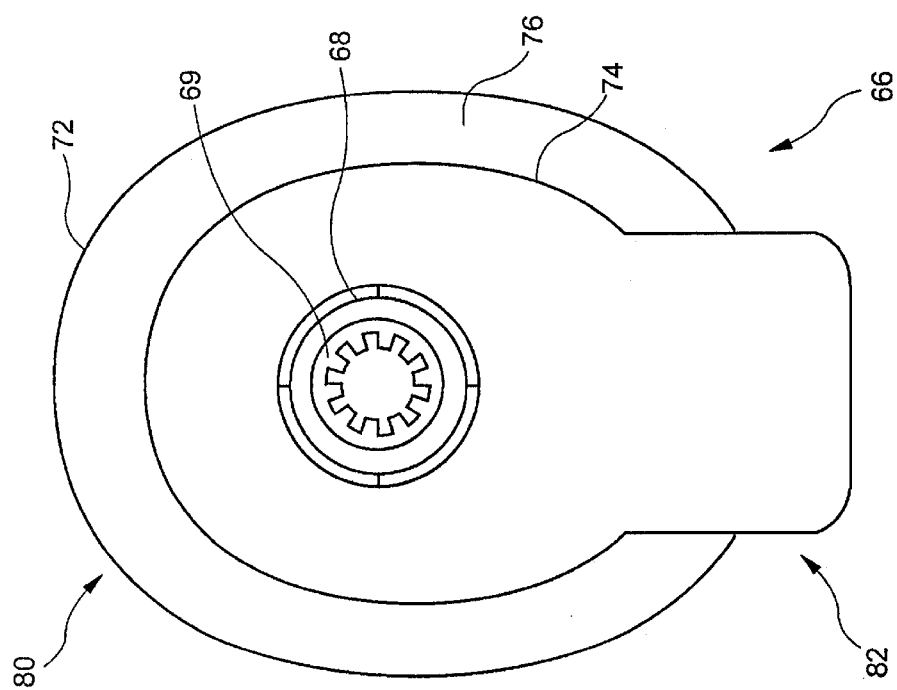
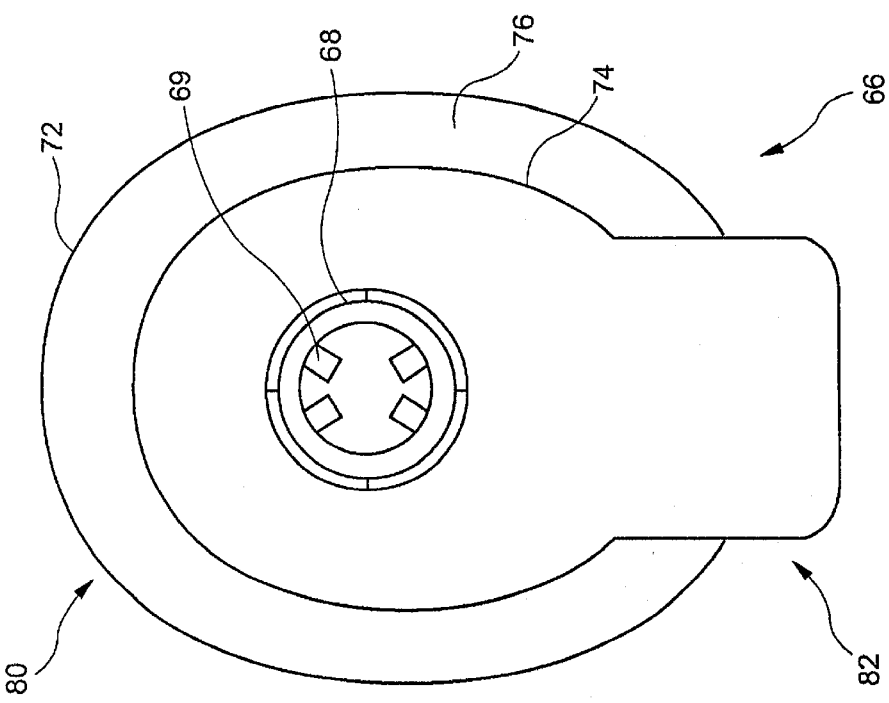

SQUEEGEE ASSEMBLY HAVING A NON-DESTRUCTIVE RELEASE MODE

This patent application claims the benefit of priority, pursuant to 35 U.S.C §119(e) of U.S. Provisional Patent Application Ser. No. 60/197,641 filed Apr. 17, 2000, and entitled, "Squeegee Assembly for a Surface Maintenance Vehicle."

FIELD OF THE INVENTION

The present invention relates to surface cleaning equipment. More particularly the present invention relates to a novel mechanical coupling for retaining a wiper assembly to a surface maintenance vehicle that preserves the wiper assembly from damage in event of contact with oversize debris, a stationary object or other impediments and obstacles which create significant resistance to the desired motion of the wiper assembly.

BACKGROUND OF THE INVENTION

Surface maintenance vehicles and cleaning devices have a long history subject to gradual innovation and improvement toward improved and oftentimes automated performance in removing debris and contamination from floors. These vehicles and devices may be self-powered, towed, or pushed, and/or manually powered and may carry a human operator during cleaning operations. Such vehicles and devices include scrubbers, extractors, sweepers and vacuums, as well as combinations thereof, intended for cleaning, scrubbing, wiping and/or drying a portion of a substantially flat surface both indoors and outdoors. Many such vehicles and devices employ a squeegee assembly for wiping dry a floor which has been cleaned by application of a cleaning solution of water and a detergent in conjunction with scrubbing action of one or more moving brushes. Accordingly, the squeegee assembly of such prior art cleaning vehicles often mounts at or near the rear of the surface maintenance vehicle to direct the solution to a removal location where the solution (including suspended dirt, particles and contaminants) is removed. In this disclosure, the term "loaded cleaning solution" shall apply to such a cleaning solution after application thereof to a floor or other surface to be cleaned. The cleaning solution is typically supplied to the floor surface through or near rotary scrub brushes operating from a lower portion of the vehicle. The squeegee assembly may include a squeegee supporting member of generally arcuate configuration with two squeegee blades spaced apart and affixed to the supporting member to promote consistent contact with the surface to be cleaned and wiped.

In some prior art cleaning vehicles having two squeegee blades, a vacuum source may couple to the wiping assembly to lift the loaded cleaning solution from the space between the blades to a remote reservoir or other collection unit. The squeegee assembly is often sufficiently wide to at least fully cover the path width of the scrub brushes and/or the wheels of the cleaning vehicle. Consequently, at least the ends of the squeegee assembly tend to be exposed at the sides of the vehicle and are therefore potentially very vulnerable to contact with stationary objects which might be encountered during operation of the vehicle during cleaning operations and when transporting the vehicle between cleaning operations. Solid contact between an end of a squeegee assembly and a stationary object such as, for example, a vertical support column, can result in substantial and costly damage to not only the squeegee assembly but also the surface maintenance vehicle itself resulting in downtime, costly repair and/or replacement of all or a part of the vehicle (as well as the stationary object) and in some circumstances causing damage or injury to the human operator of the vehicle as well.

Releasable squeegee assembly structures for cleaning vehicles and devices have been known in the art, such as that disclosed in U.S. Pat. No. 4,363,152 issued Dec. 14, 1982 to Karpanty. In this prior art reference, a squeegee assembly includes a squeegee-bearing mounting plate having threaded bolts mechanically connected via conventional wing nuts to rear-facing open-ended slots extending from a cleaning vehicle. The resulting metal-on-metal contact between the bolts, slots and nuts provides a so-called "friction fit" attachment with a frictional force magnitude depending on the degree of tightening of the individual wing nuts. In the event the squeegee assembly collides with an unmovable obstacle, presumably each nut and bolt pair moves out of, and disconnects from, its respective slot at some discrete, albeit somewhat arbitrary, level of imparted force. If the nut is in fact overly tight, the release mechanism will not provide for the squeegee to disengage unless and until such level of force reaches said arbitrary level of imparted force, regardless of: (i) the amount of contact time between the squeegee and the obstacle; (ii) the degree of damage incurred by the squeegee; (iii) the elasticity of the collision between the squeegee and the obstacle; and, (iv) the amount of damage incurred by the obstacle. Conversely, if the nut is in fact overly loose, the release mechanism will provide for the squeegee to disengage repeatedly without apparent or desired reason.

Accordingly, the just recited prior art approach and other known assemblies rely on a frictional force developed between opposing metallic surfaces. Unfortunately, as in the reference immediately above, the frictional force is fully dependent upon the degree of manual tightening of a knob or wing nut. One limitation of these known squeegee assembly release structures is that the release force is variable and dependent upon the degree of manual tightening and resulting friction developed between the opposed metallic surfaces.

As stated above, over-tightening may effectively prevent release of the assembly with resulting damage and loss to the cleaning vehicle, the facility being cleaned and even the operator of the vehicle. Inadequate tightening may result in repeated, premature release of the assembly with associated costly downtime, re-cleaning, and re-attachment (again without calibration or other measures to ensure adequate tightening). In addition, when more than one such attachment location must be addressed and suitable mechanically coupled, the possibility of un-even tightening becomes a probability with costly implications similar to those cited above.

SUMMARY OF THE PRESENT INVENTION

The present invention teaches, enables and discloses an improved mechanical coupling for a wiper assembly usable in a surface maintenance vehicle. Such a vehicle includes those self-powered and manually powered cleaning vehicles applied to the task of removing loaded cleaning solution from a cleaned surface and preferably include all such vehicles using an articulated wiper assembly; although rigid or fixed wiper assemblies for such vehicles benefit from the teaching of this disclosure. Such a surface may comprise an interior or exterior floor having some limited porosity but preferably comprising finished concrete (whether painted or sealed), asphalt, ceramic tile, resin-based tile, and the like and including most types of flooring typical of commercial and industrial-grade facilities. However, the teaching hereof finds application in diverse handling of fluids, whether or not "loaded," naturally-occurring liquid(s) or pure cleaning fluid.

Accordingly, the articulated wiper assembly of the present invention tolerates a wide variety of stresses imparted to the blade portions of a wiper assembly during wiping operations and before becoming temporarily disconnected from a surface maintenance vehicle to which it is coupled. In most embodiments of the present invention, the wiper assembly couples to a mounting plate member coupled to the maintenance vehicle and typically designed to permit the wiper assembly to articulate, or "float," thereby maintaining contact between one or more wiper blades secured to the wiper assembly and a portion of the surface to be cleaned during operation of the surface maintenance vehicle. An articulated wiper assembly utilizing the teaching of the present invention thus may be raised, lowered, pivoted and/or rotated either passively using gravity or manually using gearing, cables and the like and/or via internal combustion, electric, pneumatic, hydraulic or other motive means.

The improved mechanical coupling of the present invention by using a deformable member adds a modicum of additional travel, while not increasing the degree of mechanical freedom of existing articulated wiper assemblies in response to stress forces imparted to a wiper assembly. Accordingly, the teaching of the present invention may be applied to previously manufactured surface maintenance equipment and vehicles, in the form of retrofitted mechanical couplings, requiring modest engineering and installation efforts.

While not required to practice the present invention, in one preferred embodiment of the present invention at least two wiper blades are both secured to a mounting plate which forms a substantially sealed chamber when biased toward the surface to be cleaned. A source of vacuum is applied to a port formed in a side of the sealed chamber to evacuate the loaded liquid and the like from the sealed chamber to a storage vessel or reservoir in anticipation of later disposal.

During cleaning operations, as the maintenance vehicle is propelled forward over a portion of a surface to be cleaned, when the articulated wiper assembly contacts a relatively stationary object, or otherwise becomes subject to instantaneous or very rapidly increasing resistance to forward movement, the improved mechanical coupling for the articulated wiper assembly initially absorbs some of the stresses imparted to the wiper assembly. Typically, portions of each improved mechanical coupling designed to absorb the stress forces will deform most nearest the location of increasing resistance to forward movement, and may either become fully disconnected if the stress force reaches a threshold force value or recoil to the original mounting location after absorbing forces that are less than said threshold force value. The threshold value force at which a wiper assembly dislodges from its mounting location is designed to avoid damage to the wiper assembly, the articulated mounting member (if any), and the maintenance vehicle itself. The threshold force value may vary but due to the design of the improved mechanical coupling of the present invention, said threshold force value should have a substantially similar magnitude independent of the axial compressive force applied each time the mechanical coupling attaches a wiper assembly to a maintenance vehicle.

A further advantage of the improved mechanical coupling provided herein is that the wiper members and the entire wiper assembly is permitted a slight range of motion in both a select vertical dimension, or set of vertically-oriented axes, and in a horizontal dimension, or set of horizontally-oriented planes. In effect, the present invention adds a small but useful range of three dimensional motion to the parts thus coupled together, albeit composed in majority of both vertical and horizontal components of motion, so that during cleaning operations the wiper assembly is not fully constrained only to the range of motion provided by the articulated mounting location but has a second, substantially independent range of motion due to the improved mechanical coupling of the present invention. The second, substantially independent range and precision of motion provides mechanical tolerance to discrete instantaneous forces affecting the wiper assembly so that the wiper blades exhibit an increased effectiveness in response to contact with diverse size obstacles present on, and obstacles adjacent to, a surface to be cleaned.

In a preferred form, the improved mechanical coupling comprises a resilient, deformable member, capable of absorbing stress primarily in a horizontal plane opposing to a forward direction of travel for the maintenance vehicle. The deformable member is preferably shaped like a round washer member having a substantially common-radius central aperture, or passageway, and an enlarged head feature of increased outer radius on one end thereof. The deformable washer member is also preferably biased to support the enlarged head feature on an upper side of a mounting location at all times regardless whether or not the wiper assembly is coupled thereto.

In addition, in combination with the deformable washer member (and biasing feature for ease of mounting and remounting same) a substantially non-deformable central sleeve member resides within the common-radius central aperture thereof to limit the deformation of the deformable washer member, thereby functioning as a mechanical "travel stop"feature, and thus creating a fairly uniform and limited range of compressive force for the entire assembly when operatively coupled to a maintenance vehicle. Of course, a variety of different components may be substituted for the central sleeve member as a travel stop such as a rigid pin or set of such pins or irregularly shaped members embedded in, or disposed adjacent to, the deformable washer member will suffice to limit the amount of compression-induced deformation of the deformable washer member. Thus, the deformable, resilient coupling may include a relatively rigid stop element, such as a sleeve member formed of material designed to withstand deformation in an axial direction, through which a preferably threaded shank is received during assembly. The metal sleeve operatively limits the degree of deformation of the deformable, resilient coupling portion during assembly.

Those of skill in the art will recognize that various other structure may serve in lieu of the functionality provided by a compressive fastener such as a threaded shank. For example, a cam-actuated structure, a rachet-type rotary structure, a stepper or servo motor driving any of the aforesaid or similar structure in conjunction with suitable gearing, belts, shafts in conjunction with force or power conducting technologies, including pneumatic, hydraulic, piezoelectric, and electrical and using suitable conduit and coupling may be used in practicing the invention.

In a most preferred embodiment, additional mechanical biasing of the washer member is provided by a biasing structure inserted into the interior of the central sleeve member designed to support the deformable washer in a desired pre-mount configuration. This additional mechanical biasing is provided by a series of at least about four inwardly directed radial teeth, or protrusions, formed of urethane, or similar material and designed to grip a central threaded shank member and hold the entire mechanical coupling together in place adjacent a mounting location for the wiper assembly.

The mounting location preferably comprises a set of two or more open-ended discrete collar-shaped, or generally semi-circular, mounts having an open channel formed opposite the direction of travel of the maintenance vehicle. The open-ended mounts may be ovoid, toroidal, annular, or even rectangular-shaped mounts, and the like as long as the open channel, or spacing, is provided therein so that the improved mechanical coupling may exit thereof when a threshold value force impacts the wiper assembly.

In another embodiment of the present invention, a tapered bore having a bore axis formed in a structural member of an attachment member substantially parallel to the direction of travel of the cleaning vehicle has a narrow end of said tapered bore facing an assembly to be coupled thereto. The tapered bore is adapted to receive a similarly shaped resilient, deformable stopple member, or plug. The stopple member is connected to remote structure separate from the opposing tapered bore formed in the structural member. The stopple member may be provided with a source of local compression along the bore axis so that the stopple member expands to frictionally seat more firmly into the tapered bore. In an alternative embodiment hereof, the tapered bore may extend vertically through the structural member so that the stopple member may be simply dropped, or slipped, down into the vertically extending tapered bore to complete the resilient, deformable coupling between the structural member and the remote structure.

In general, the improved mechanical coupling of the present invention comprises subcomponents shaped to cooperate with other subcomponents and not limited to type of motive force applied although all elements of the improved mechanical coupling are preferably tightened, and loosened, manually.

One object of the invention is to provide an articulated wiper assembly for a surface maintenance vehicle which is tolerant of stress forces imparted to the wiper assembly and designed to progressively begin to separate from the vehicle as cumulative stresses upon the articulated wiper assembly from a physical obstacle, such as a stationary object, grow toward a threshold force value.

Another object of the present invention is to provide an articulated wiper assembly for a surface maintenance vehicle which is releasably connected to the vehicle via one or more deformable, resilient mechanical coupling members having a pre-selected release mode intended to preserve in good working order the components of the articulated wiper assembly, the surface maintenance vehicle, and the physical obstacle encountered by the wiper assembly as well as the operator of the vehicle.

Another object of the present invention is to teach, enable and disclose a class of mechanical coupling assemblies useable for connecting an articulated wiper assembly to a surface maintenance vehicle having a predetermined release force threshold which is generally the same for each of a plurality of such coupling assemblies and is substantially independent of the degree of compressive stress imparted to the mechanical coupling when first connected.

These and other objects, features and advantages will become apparent in light of the following detailed description of the preferred embodiments in connection with the drawings. Those skilled in the relevant art will readily appreciate that these drawings and embodiments are merely illustrative and not intended to limit the true spirit and scope of the invention disclosed, taught and enabled herein.

BRIEF DESCRIPTION OF THE DRAWINGS

Preferred embodiments of the invention will be described in detail hereinafter with reference to the accompanying drawings, in which like reference numerals refer to like elements throughout.

FIG. 7 is a plan view depicting an embodiment for a biasing structure disposed adjacent to a sleeve member which engages a compression means (not shown) according to the present invention.

FIG. 8 is a plan view depicting an embodiment for a biasing structure disposed adjacent to a sleeve member which engages a compression means (not shown) according to the present invention.

DETAILED DESCRIPTION OF PREFERRED EMBODIMENTS

Figure 1:
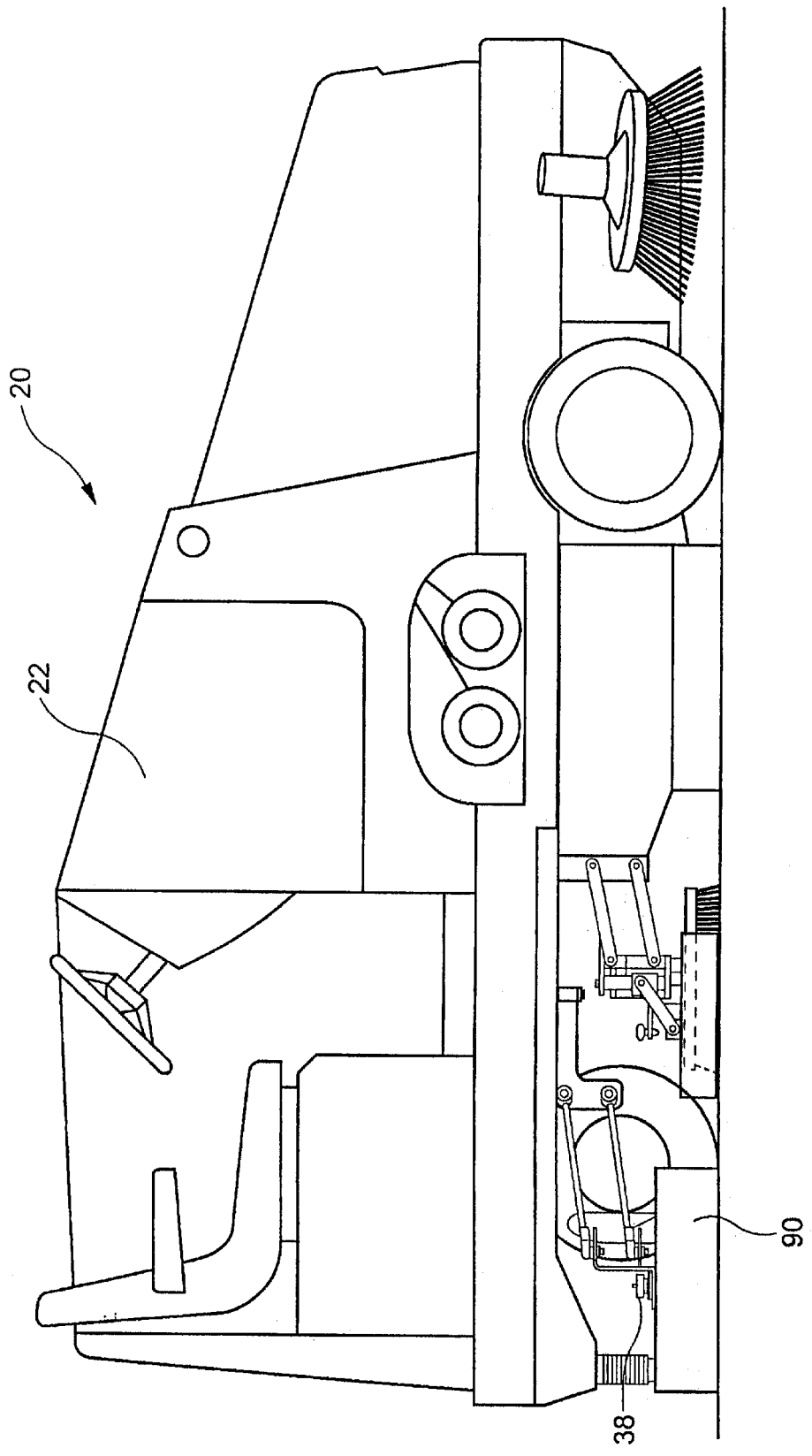
FIG. 1. is an elevational side view of an exemplary self-propelled surface maintenance vehicle employing an embodiment of the articulated wiper assembly having a vacuum source fluidly coupled thereto and wherein a human user controls and operates the vehicle from an integrated operator station disposed on and near the rear of the vehicle so that when the vehicle is propelled forward during cleaning the articulated wiper assembly completes a final step comprising wiping the surface and evacuating loaded cleaning solution via the vacuum source.
Figure 2:
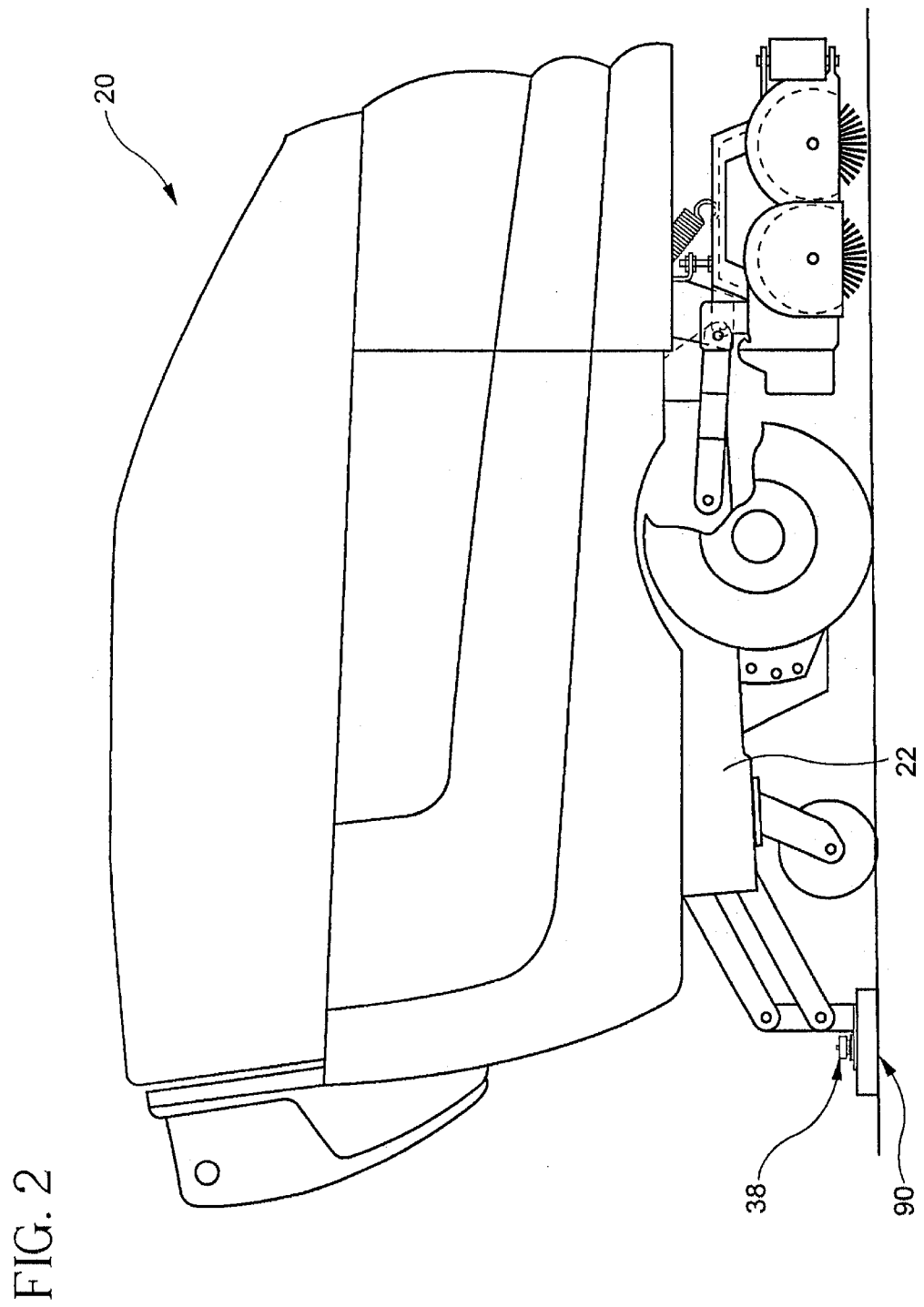
FIG. 2 is an elevational side view of an exemplary surface maintenance vehicle employing an embodiment of the articulated wiper assembly and wherein a human user controls and operates the vehicle while walking behind the vehicle.

Industrial sweeper-scrubbers which may use the present invention are shown in FIGS. 1 and 2. These surface maintenance machines may be used for sweeping and/or scrubbing floors in factories, warehouses, and other industrial or commercial establishments. As shown in FIG. 1, a riding-type surface maintenance vehicle 20 has a frame 22, and is supported on a plurality of front and rear wheels. Typically, such a surface maintenance vehicle 20 includes a variety of implements such as brushes and systems for dispensing cleaning solutions typically composed of detergent and water which suspend dirt. Herein, a cleaning solution containing suspended dirt and other particles shall be called a "loaded cleaning solution." Loaded cleaning solution and other liquid material are usually removed by a wiper blade assembly, referred to herein from time to time as an articulated wiper assembly. Such an articulated wiper assembly 90 is often mechanically coupled near the rear of a surface maintenance vehicle 20. Such an articulated wiper assembly 90 is operatively connected to the surface maintenance vehicle 20 by a releasable attachment device 38 as further described in more detail herein. One example of such a surface maintenance vehicle is disclosed in U.S. Pat. No. 5,455,985, assigned to Tennant Company, the assignee herein, and incorporated herein by reference in its entirety.

Alternatively, FIG. 2 illustrates a walk-behind surface maintenance vehicle, such a floor scrubbing vehicle disclosed in U.S. Pat. No. 5,483,718, assigned to Tennant Company, the assignee herein, and incorporated herein by reference in its entirety. As with the above-mentioned riding-type surface maintenance vehicle, the walk behind surface maintenance vehicle 20 includes variety of implements such as brushes and is capable of applying cleaning solutions. Again, loaded cleaning solution and other liquid material are usually removed by an articulated wiper assembly 90 located at rear of the surface maintenance vehicle 20. And again, such an articulated wiper assembly 90 is operatively connected to the surface maintenance vehicle 20 by a releasable attachment device 38 as described in more detail herein. The present invention, however, is concerned with releasably securing a portion of the cleaning assembly to these types of vehicles, and not the sweeping or other functional aspects of the vehicles. The particular surface maintenance vehicles illustrated in FIGS. 1 and 2 are thus relevant insofar as depicting the preferred environment with which the present invention is concerned.

Figure 3:
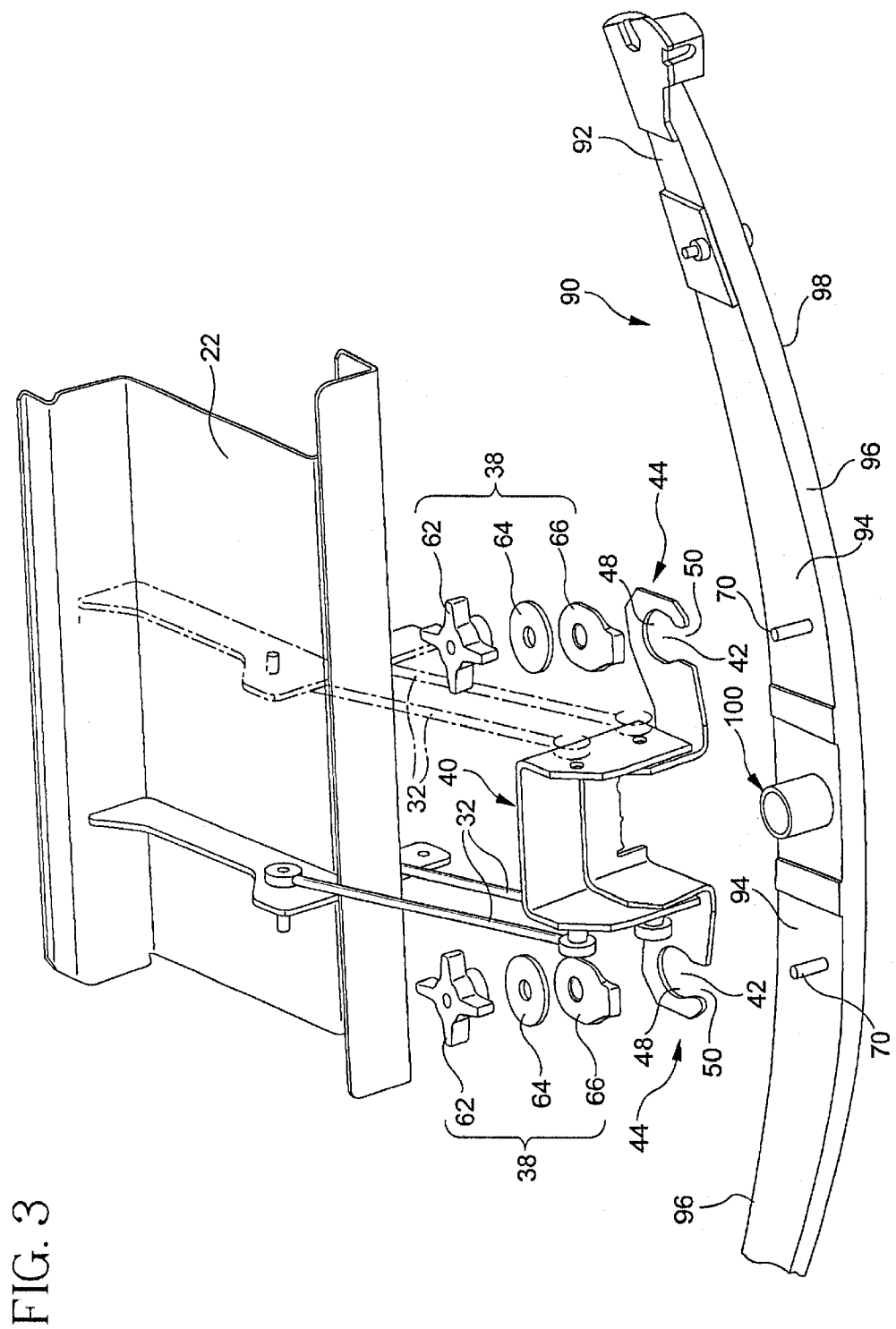
FIG. 3 is an exploded perspective view of the subcomponents of the inventive improved mechanical coupling of the present invention shown in proximity with an embodiment of representative structure providing mechanical connection to a floor maintenance vehicle and to a wiper blade assembly.
Figure 5:
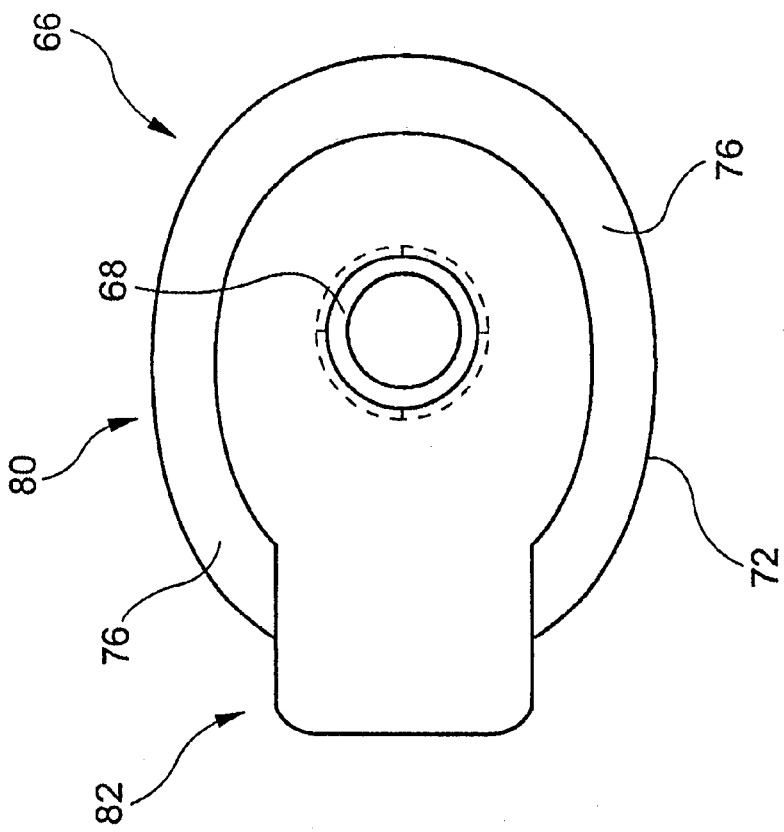
FIG. 5 is a plan view of a partially assembled improved mechanical coupling according to the present invention depicting the mounting ring which is attached to the vehicle and the deformable, resilient washer member with the mechanical stop element in place in the central aperture of the deformable, resilient washer member.
Figure 4:
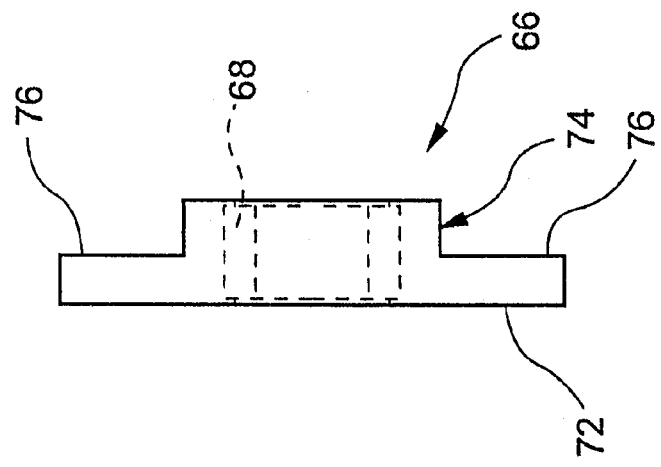
FIG. 4 is an elevational side view in partial cross section depicting an embodiment of the deformable, resilient washer member and a mechanical stop feature (in ghost) disposed therein and wherein the FIG. 4 is rotated ninety degrees from the actual orientation used when assembled according to preferred forms of the present invention.

Referring to FIG. 3, the articulated wiper assembly 90 is operatively and releasably connected to the frame 22 of a surface maintenance machine 20 by an attachment device 38. The attachment device 38 includes a first component 40 having a mounting portion or plate 44 which is operatively connected to the surface maintenance vehicle 20 for vertical movement in order to raise and lower the articulated wiper assembly during cleaning operations and transport. Vertical movement of the articulated wiper assembly 90 may be accomplished via a variety of well known approaches such as hydraulic, pneumatic, electric, spring-biased, manually driven cables and/or gearing and the like (not shown). The mounting portion 44 may also "float" relative to the vehicle to enable the articulated wiper assembly to remain fully in contact with surfaces being cleaned, even though they are somewhat irregular or uneven. Additional elements of the attachment device 38 are disclosed herein.

Figure 6:
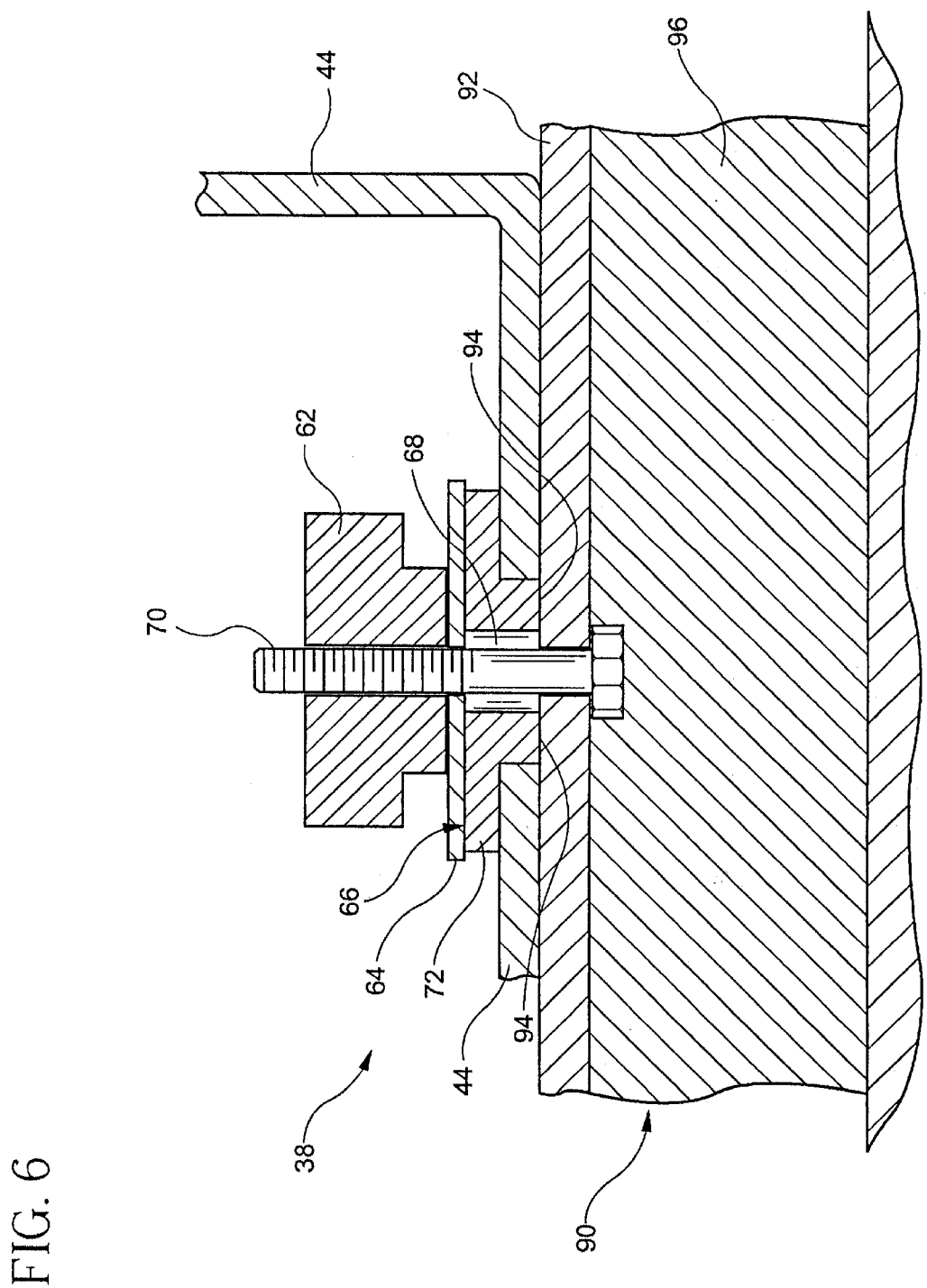
FIG. 6 is an elevational side view in cross section of a fully assembled mechanical coupling according to the present invention and also depicting a portion of mounting structure of the vehicle and the wiper blade assembly.

In one preferred form, the articulated wiper assembly 90 is releasably coupled to the first component 40 by a releasable coupling assembly 38 which is coupled between the wiper assembly 90 and the machine 20 during assembly. As illustrated in FIGS. 3 and 6, in one preferred embodiment the coupling assembly 38 includes a mounting portion 44, an adjustable actuator 62, a washer 64, a deformable, resilient coupling portion 66, a stop element 68 and a fastening element 70.

In the preferred embodiment, two fastening elements or shanks 70 are attached to the wiper assembly 90 to define attachment points between the articulated wiper assembly 90 and the first component 40. In turn, the mounting portion 44 of the first component 40 is coupled to the chassis through a plurality of linkages 32. These linkages 32 operatively connect the articulated wiper assembly 90 to the surface maintenance vehicle 20 and are arranged in an articulated manner which allows the wiper assembly 90 to maintain its horizontal orientation as it moves vertically to accommodate variations in the floor. The linkages 32 also allow the articulated wiper assembly 90 to maintain its horizontal orientation as it swings sideways or laterally during turns to better track the water path from the brushes. Preferably, the linkages 32 are provided with ball joints (not shown) at their ends where they are attached to the frame or chassis and the mounting portion of the first component 40.

Referring still to FIG. 3, a detailed, exploded perspective view of the attachment device 38 according to the present invention is illustrated. The cleaning or articulated wiper assembly 90 includes a support member 92 of generally arcuate or shallow v-shaped configuration with spaced squeegee blades or flexible wipers 96 depending therefrom for contact with the surface. The support member 92 defines at least a pair of substantially planar coupling engaging surfaces 94 surrounding the fastening elements or shanks 70. Oftentimes, a vacuum source (not shown) in fluid communication via a passage 100 with a vacuum chamber 98 defined by the squeegee blades 96 lifts the loaded cleaning solution from the surface.

The deformable, resilient coupling portion or mounting ring 66 as illustrated in FIGS. 4 through 11, includes an engaging surface 74 configured to cooperatively interact with a coupling receiving area 42 of the first portion 40. The deformable, resilient coupling portion or mounting ring 66 also includes an extension or flange 72 having an additional engaging surface 76. Together, these surfaces 74, 76 provide a variable frictional separation resistance between the mounting portion 40 and the wiper assembly 90, depending upon the extent to which the adjustable actuator 62 is selectively positioned along the shank 70. Preferably, the deformable, resilient coupling portion 66 of the coupling assembly 38 is generally toroidal or ring-shaped, ovoid, annular, or donut-shaped and preferably comprised of a polyurethane material having a durometer hardness value of between 70–85 Shore. It is understood, however, that a variety of alternative materials having predetermined frictional coefficients and/or hardness qualities (or "durabilities") may also be practicable for use in practicing the present invention, including combinations of materials comprising a single component but having different hardness values.

The deformable, resilient coupling portion or mounting ring 66 includes a head portion or section 80 and a neck portion or section 82 configured to cooperate with surfaces of the coupling receiving area 42 as described herein. The coupling assembly 38 also includes a stop element 68 in the form of a rigid sleeve which operatively limits the extent to which the first fastening element or adjustable actuator 62 is selectively positioned along the first fastening element or shank 70 and which, in turn, determines the amount of deformation (along a vertical axis) of the deformable, resilient coupling portion 66 during assembly of the attachment device 38. In limiting the amount of deflection of the deformable, resilient coupling portion 66, the stop element 68 limits and/or controls the amount of frictional resistive force developed between the releasable attachment device 38 during a release operation. It will be appreciated that the stop element need not be a sleeve. For example, it may be solid and positioned at various location in the deformable, resilient coupling portion. Alternatively, the stop element may be formed as an extension of the washer or be integral with the actuation element or knob.

The coupling receiving area 42 of the mounting portion 44 includes an enlarged portion or section 48 and a channel portion or section 50, respectively, which cooperate with surfaces 72, 74 of the deformable, resilient coupling portion or mounting ring 66. Alternative geometry for aperture 46 and/or mounting ring 66 will be appreciated by those skilled in the art, e.g., the dimensions, sizes and material selected or shape of structures of the second coupling receiving area and/or deformable, resilient coupling portion may different that those depicted herein, but should still prove useful and be practicable given the teaching hereof.

Preferably, the coupling assembly or attachment device 38 includes a pair of compressible fitting assemblies. However, it will be appreciated that other numbers of matching components may be utilized. The deformable, resilient coupling portions or mounting rings 66 are held between the planar surfaces 94 of the articulated wiper assembly 90 and the washers 64, respectively, by threaded shanks or first fastening elements 70 and threaded knobs or second fastening elements 62, which preferably may be tightened or loosened by hand. A variety of shank and/or knob sizes would be appreciated by those skilled in the relative arts. The knob or adjustable actuators 62 may be tightened until the stop elements 68 of the coupling assemblies 38 are brought into contact with the planar surfaces 94 of the cleaning assembly 90, thus limiting and/or controlling the degree of axial compression of the deformable, resilient coupling portions or mounting rings 66.

As described herein, the deformable, resilient coupling portion or mounting rings 66 in this method are deformable (along a substantially horizontal plane) during a contact condition in which the articulated wiper assembly 90 is released from the surface maintenance vehicle 20. During a release operation, the lower portion edges 74 and the head portion 80 of the deformable, resilient coupling portions 66 are temporarily deformed as they pass along and through the channel portions 50 of the coupling receiving areas 42 prior to separation of the articulated wiper assembly 90 from the surface maintenance vehicle 20. During the release operation, the deformable, resilient coupling portions 66 provide both a resistive "shearing"-type force as the head portions 80 of the deformable, resilient coupling portions 66 pass through the channel portions or section 50 of the coupling receiving areas 42, and a frictional force developed between the upper, lower and side surfaces of the deformable, resilient coupling portions 66 in contact with side surfaces of the coupling receiving area 42, planar surfaces 94 of the cleaning assembly 90, and washers 64

Several alternate forms of compression means may be used in conjunction with the present invention. For example, a cam-actuated fastener or clasp member operable between an open, or low-compression state, and a closed, or high compression state, and wherein the cam-actuated clasp member is configured to compressively engage the deformable, resilient washer member 66. Furthermore, a uni-directional or bi-directionally operating rachet-actuated compression device (e.g., a toothed wheel or rack engaged with a pawl that permits it to move in only both directions). In addition to a cam-actuated compression utility or a rachet-type compression utility, or a threaded shank and threaded nut combination, an electrical stepper motor or servo motor suitably coupled to any of the above with appropriate gearing and mechanical travel stops and the like, may be used to create desired compression.

Subsequent to a release operation, a cleaner or articulated wiper assembly 90 may be reconnected to a surface maintenance vehicle 20 by loosening the knobs 62 a sufficient amount to allow the head portions 80 of the deformable, resilient coupling elements 66 to be positioned into their respective coupling receiving areas 42 and then tightening the knobs 62 to the extent permitted by the stop elements 68.

In a preferred form of the present invention, additional mechanical biasing of the washer member 66 is provided by a biasing structure 69 (e.g., a metallic spring member, a flanged inner sleeve member or other biasing structure and the like) inserted into the interior of the central sleeve member designed to support the deformable washer in a desired, pre-mounting configuration. This additional mechanical biasing is provided by a series of at least about four inwardly directed radial teeth, or protrusions, formed of urethane, or similar, material designed to grip a central threaded shank member and hold the entire mechanical coupling together above the mounting location for the wiper assembly. These additional mechanical biasing members 69 work opposite to the sleeve member 68, in that the sleeve member 68 operatively limits the degree of deformation of the deformable, resilient coupling portion during assembly while the additional biasing members 69 promote ease of initial assembly and re-assembly for the coupling of the present invention.

A set of illustrative embodiments for said additional mechanical biasing members 69 are depicted in the following drawings; namely, FIG. 7, FIG. 8, and FIG. 9.

Referring now to FIG. 7 which is a plan view depicting an embodiment for a biasing structure 69 disposed adjacent to a compression means (not shown) according to the present invention. In this embodiment, the biasing structure 69 has four protruding flexible flanges which releasably engage the shank member 70 prior to finally firmly coupling the subcomponents of the deformable mechanical coupling as taught herein.

Referring now to FIG. 8 which is a plan view depicting another embodiment (in addition to the embodiment depicted in FIG. 7) for a biasing structure 69 disposed adjacent to a threaded shank (not shown) according to the present invention. The embodiment depicted in the FIG. 8 has a plurality of flexible flanges protruding toward and flexibly engaging the shank member 70 during pre-assembly.

Figure 9:
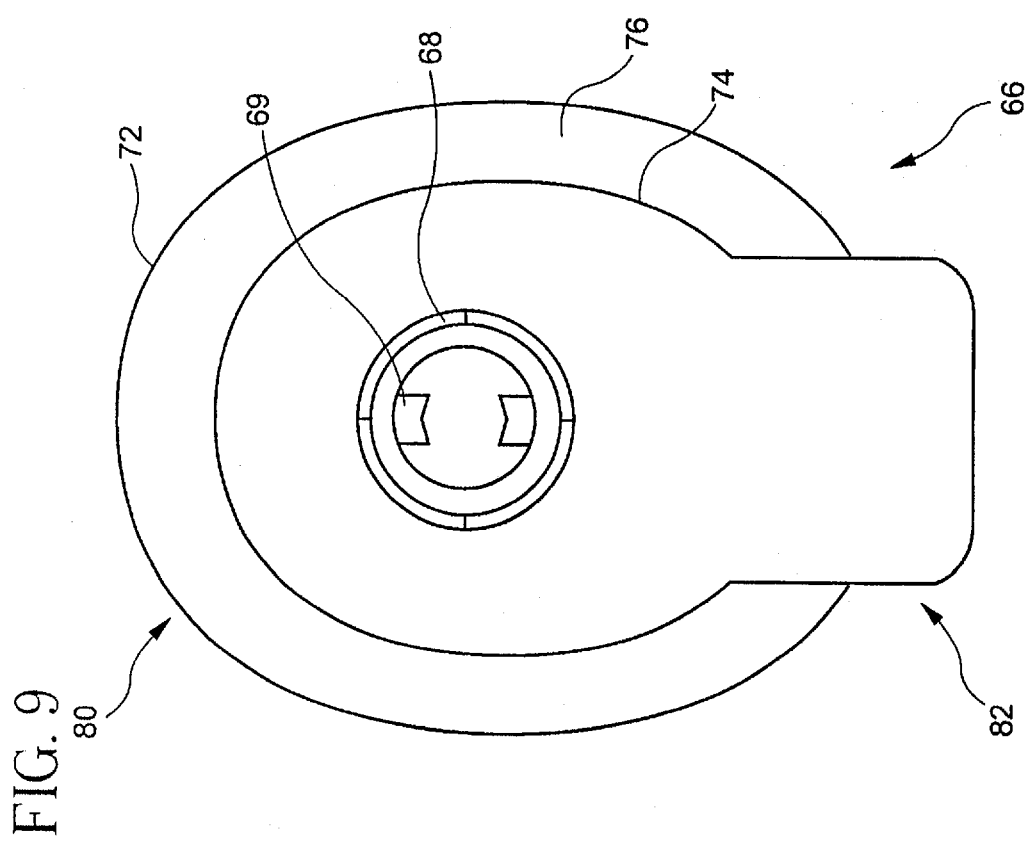
FIG. 9 is a plan view depicting another embodiment for a biasing structure disposed adjacent to a sleeve member which engages a compression means (not shown) according to the present invention.

Referring now to FIG. 9 which is a plan view depicting another embodiment (in addition to the embodiment depicted in FIG. 7 and FIG. 8) for a biasing structure 69 disposed adjacent to a threaded shank (not shown) according to the present invention. The embodiment depicted in the FIG. 8 has dual inverted "v" shaped opposing flexible flanges protruding toward and flexibly engaging the shank member 70 during pre-assembly of the inventive mechanical coupling hereof.

Figure 11:
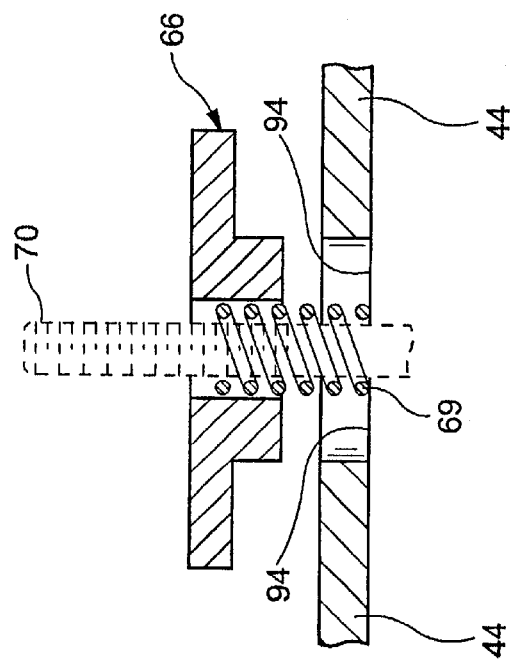
FIG. 11 is an elevational view in cross section of an embodiment for another biasing structure (i.e., a spring member) disposed adjacent to a threaded shank and a washer member as assembled and fully compressed but not depicting the actuator thereof (e.g., a knob threaded to mechanically cooperate with a threaded shank) according to the present invention.
Figure 10:
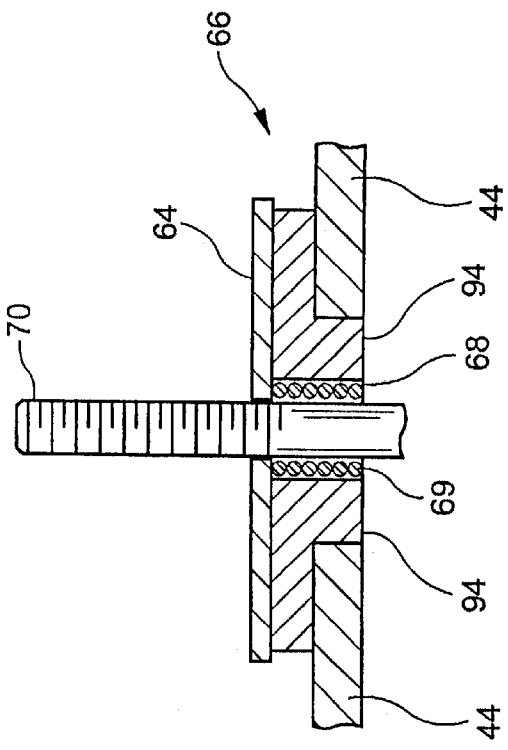
FIG. 10 is an elevational view in cross section of an embodiment for another biasing structure (i.e., a coiled spring member) disposed adjacent a sleeve member, which together surround a threaded shank according to the present invention.

Referring now to FIG. 10 and FIG. 11 together, which are elevational views in partial cross section of an embodiment for another biasing structure 69 (i.e., a spring member) disposed adjacent to a threaded shank 70 and a first washer member 64 as assembled and fully compressed (but not depicting the knob threaded to mechanically cooperate with the threaded shank 70) according to the present invention. As best illustrated in FIG. 11, when the actuator, or knob 62 is released from the shank 70, the biasing structure 69 (a spring in FIG. 1) retains the deformable washer member is place adjacent the surfaces 44,102 coupled thereto. In related embodiments hereof, the spring member may comprise a leaf spring or a coil spring and the like made of material which retains a majority of the spring constant of such structure so that over time the function of the another biasing structure does not appreciably deteriorate.

Figure 12:
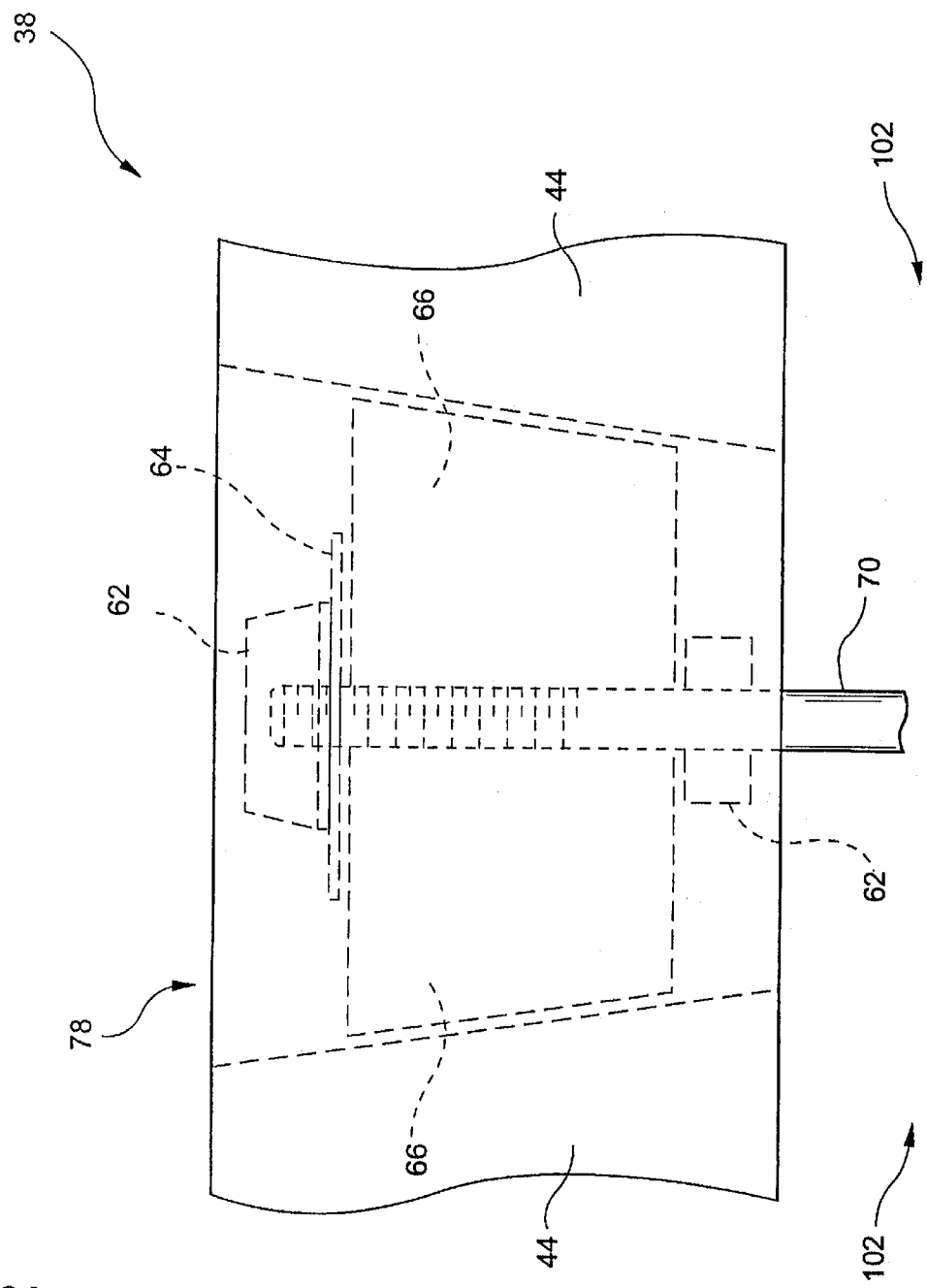
FIG. 12 in an elevational view of another embodiment of the present invention wherein a tapered axial bore shown in ghost provides a primary mounting surface to receive a similar tapered-shape compressible stopple member also shown in ghost and the compressible stopple member is adapted to receive and retain a connector shaft shown in ghost which mechanically couples to remote structure to complete the coupling between the primary mounting surface and the remote structure.

In FIG. 12 a further embodiment is depicted which performs substantially as described elsewhere herein in relation to the preferred embodiments. In the embodiment depicted, a coupling passageway, or bore 78, comprising a conical, pyramidal or other tapering-shaped channel portion (when viewed in cross section) has a narrow end opposing a less narrow end so that the tapering-shaped channel portion may receive a stopple member 66 within the coupling passageway 78. The coupling passageway may be formed on either a coupling portion 44 of either the cleaning vehicle or on the articulated wiper assembly 90 as desired for a given application to couple surface 44 to surface 102. The stopple member 66 is preferably formed of a resilient compressible material as taught elsewhere in this disclosure with a receiving aperture formed through the stopple member 66 and sized to fit snugly within a portion of the coupling passageway. As with other embodiments of the present invention disclosed herein, a connector member, or shank 70, extending from the cleaning vehicle 20 (in one form of this embodiment) is inserted through the receiving aperture and a washer 64, or cap member, mechanically attached on the emergent end of the connector member 70. Of course, the washer member 64 should be fabricated of substantially non-deformable material and may be of any arbitrary shape but must be of sufficient diameter to retain the stopple member 66 under increasing magnitude separation forces. The washer member 64 must be small enough to freely exit the narrow end of the coupling passageway. In addition to the washer 64, or cap member, a means of providing compression to the stopple member. In the embodiment depicted in FIG. 12, compression is provided by rotating one or both opposing threaded nuts 62 coupled to threaded shank 70 on each side of the stopple member 66. The nuts 62, or other compression providing means, is preferably provided in a manually accessible location at or through the wide portion of the coupling passageway to permit enough force to be applied to the stopple member 66 when the stopple member is snugly engaged in the coupling passageway to compress and thereby expand slightly the diameter of the stopple member 66 to thereby increase the frictional fit. This embodiment differs slightly from other embodiments set forth herein in that the coupling passageway hereof is oriented more or less parallel to a direction of travel of a cleaning vehicle 20 whereas the corresponding open-ended mounting structure(s) described elsewhere herein is more or less orthogonal, or perpendicular, to the direction of travel of the cleaning vehicle 20.

Figure 13:
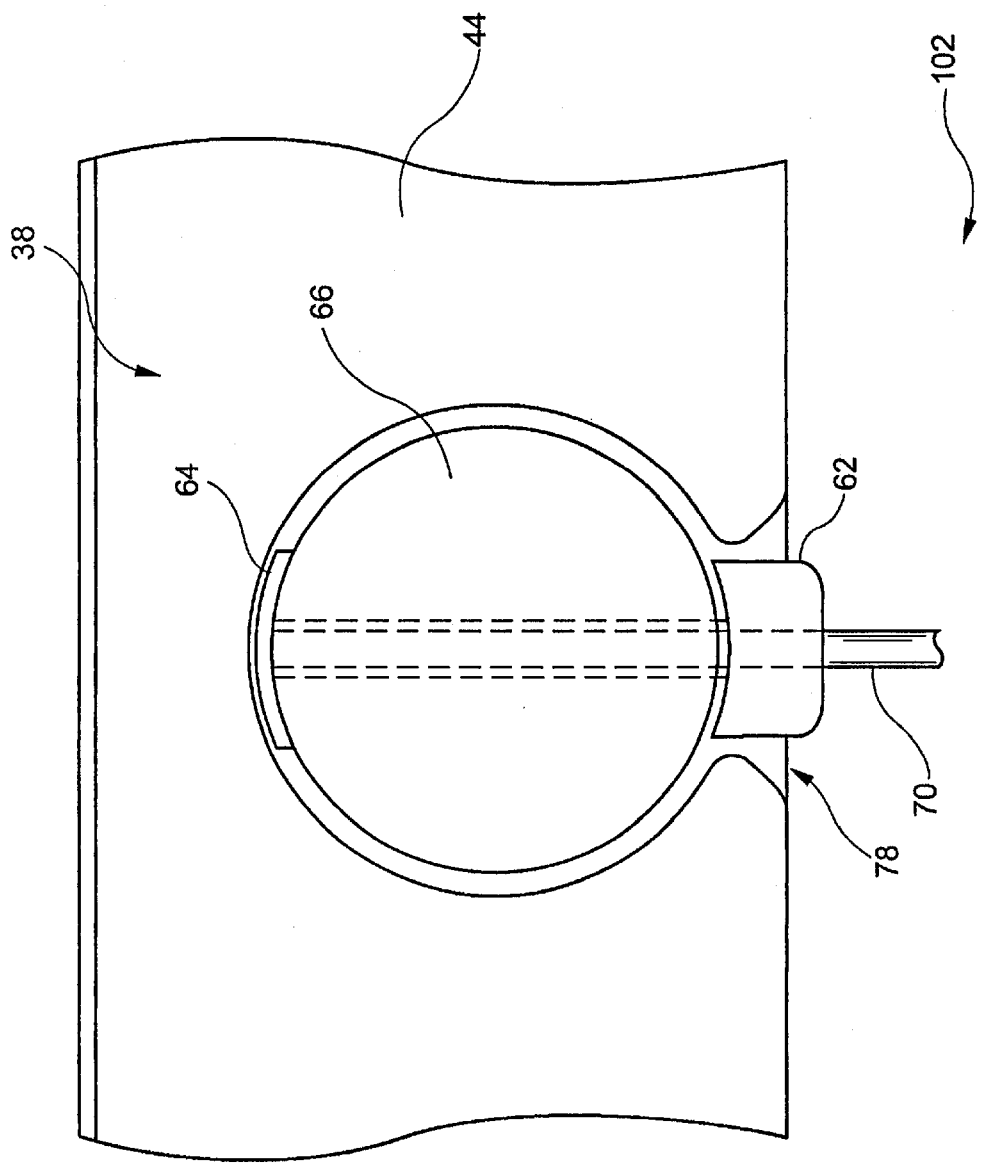
FIG. 13 is a plan view of another embodiment of the present invention wherein a substantially round resilient, deformable member is received in a substantially circular bore or slot formed in a mounting surface, the deformable member is adapted to receive an retain a connector shaft which mechanically couples to remote structure to complete the coupling between the mounting surface and the remote structure.

In another related embodiment depicted in FIG. 13, the teaching of the present invention as applied to a modified so-called ball and socket mechanical coupling. In this embodiment, a substantially round resilient deformable member 66 is seated in a blind hole or other suitably shaped cavity formed in a first surface 44 to be coupled, and a threaded shank (and/or equivalent) member 70 is disposed through the deformable member 66 and a suitably shaped washer member 64 is connected thereto and within the blind hole. A means for compressing the deformable member 66, such as a threaded nut 62 couples to the shank so that the deformable member 66 expands in diameter when the threaded nut 62 is rotated. If the blind hole is disposed on a wiper assembly member 90 then the threaded shank 70, deformable member 66 and related parts should be firmly mechanically coupled thereto. In this example, the surface 44 resides on a portion of the wiper assembly 90 and the surface 102 remotely couples to a cleaning vehicle 20. In a further related embodiment, the blind hole comprises a bore 78, or aperture, providing manual access to each end of the shank member 70 and in many respects closely resembles some of the other embodiments taught, enabled and illustrated herein. As with said other embodiments, in these particular embodiments which include a substantially round deformable member 66, the threaded shank 70 may be replaced with any assembly which may be manipulated manually, hydraulically, mechanically, electrically or otherwise to provide a compressive force to the deformable member 66 as elsewhere mentioned herein. Furthermore, of course, different types, sizes configurations and orientations of such coupling members and related passageways and mounting structures may be used for a single multi-point coupling arrangement as between a cleaning vehicle 20 and a wiper assembly 90.

In addition, while not depicted in the drawings, an electric continuity circuit or sensor assembly may be disposed adjacent or integral to the components of the present invention so that upon separation thereof an output signal routed to an operator of the vehicle alerts the operator of a cleaning vehicle 20 of the separation condition. The signal may take the form of a visual signal such as light, beacon, or icon displayed on a CRT or flat panel monitor, or the signal may comprise an audible signal, or other similar signals and combinations thereof. Furthermore, a mechanical signaling apparatus or conduit may be affixed to a portion of the articulated wiper assembly 90 so that when the wiper assembly 90 becomes dislodged from the cleaning vehicle 20, an operator of the cleaning vehicle receives notice of the separation condition. The signaling apparatus or circuitry of this form of the invention may furthermore provide a signal corresponding to a partially-dislodged condition and/or a signal for each one of a plurality of mechanical coupling pairs utilized by a given surface maintenance vehicle 20.

Additional advantages and modifications will readily occur to those skilled in the art upon reflection on the teaching, written disclosure and illustrations herein. The invention in its broader aspects is, therefore, not limited to the specific details, representative apparatus and illustrative examples shown and described. Accordingly, departures from such details may be made without departing from the spirit or scope of the applicant's general inventive concept. For example, if one were to reverse the function of the deformable washer member and the mounting location so that the mounting location comprised a resilient deformable open ended member and the washer member comprised a rigid washer member a similar coupling obtains. Likewise, the mounting bracket or member may reside on the wiper assembly and the resilient, deformable washer may reside on a portion of a surface maintenance vehicle and accomplish the desired results of the described and depicted embodiments of the present invention hereof, without departing from the teaching hereof.

We claim:

1. A mechanical coupling comprising:
   a surface maintenance vehicle moving in a predetermined direction during operation;
   a cleaning assembly in floor surface contact during said vehicle operation;
   an open-ended mounting structure coupled to the surface maintenance vehicle and wherein the open-ended mounting structure has a major interior space adjacent a narrow opening, and wherein said narrow opening lies between a first end of said open-ended mounting structure spaced from and opposing a second end of said open-ended mounting structure, said major interior space opening through the narrow opening in a direction substantially opposite the predetermined direction of vehicle motion; and,
   a deformable, resilient member at least partially disposed in said major interior space, wherein at least a portion of said deformable, resilient member passes through the narrow opening in a direction substantially opposite the predetermined direction of vehicle motion during a release event which separates the cleaning assembly from the surface maintenance vehicle, said release event resulting from a contact of the cleaning assembly with an obstruction on the floor surface.

2. A mechanical coupling according to claim 1, further comprising a compression means for exerting an axial force so that said deformable, resilient member expands within the major interior space and frictionally seats against a portion of an interior edge region of said major interior space.

3. A mechanical coupling according to claim 2, wherein the compression means further comprises an elongate threaded shank disposed in a passageway of the deformable, resilient member.

4. A mechanical coupling according to claim 3 further comprising a rigid sleeve member disposed in the passageway and between the elongate threaded shank and the deformable, resilient member.

5. A mechanical coupling according to claim 1, wherein the open-ended mounting structure further comprises a mounting plate, and wherein the mounting plate is mechanically coupled to the surface maintenance vehicle.

6. A mechanical coupling according to claim 5, wherein the major interior space and the narrow opening are disposed upon the mounting plate in a substantially co-planar orientation.

7. A mechanical coupling according to claim 5, wherein the open-ended mounting structure is pivotally coupled to the surface maintenance vehicle.

8. A mechanical coupling according to claim 1, wherein the deformable, resilient member contacts a majority of an interior edge region of the major interior space of the open-ended mounting structure.

9. A mechanical coupling according to claim 1, wherein said deformable, resilient member is formed of a polyurethane material having a durometer value of between 70 to 85 Shore.

10. A mechanical coupling according to claim 1, wherein said deformable, resilient member further comprises a larger diameter upper portion, said upper portion disposed in said major interior space in a partially overlapping relationship with an interior edge region of said major interior space.

11. A mechanical coupling according to claim 10, wherein said larger diameter upper portion of said deformable, resilient member further comprises a portion in overlapping relationship with said narrow opening.

12. A mechanical coupling according to claim 1, wherein the open-ended mounting structure has a generally toroidal shape.

13. A mechanical coupling according to claim 1, further comprising an electrical circuit means for sensing the release event.

14. A mechanical coupling comprising:
    a surface maintenance vehicle moving in a predetermined direction during operation;
    a cleaning assembly in floor surface contact during said vehicle operation;
    a mounting structure having a coupling portion and a mounting portion, wherein the mounting portion mechanically attaches to a surface maintenance vehicle, said mounting structure defining an interior space adjacent a narrow opening, said major interior space opening through the narrow openeing in a direction substantially opposite the predetermined direction of vehicle motion; and,
    a deformable, resilient coupling assembly disposed in the coupling portion and attached to the cleaning assembly and wherein the coupling portion and the deformable, resilient coupling assembly are elastically and frictionally coupled together unless completely dislodged by a sustained force of significant magnitude imparted to the cleaning assembly, at least a portion of said deformable, resilient coupling passing through the narrow opening in a direction substantially opposite the predetermined direction of vehicle motion during a release event which separates the cleaning assembly from the surface maintenance.

15. A mechanical coupling according to claim 14, wherein the coupling portion comprises a throat structure having an enlarged central space adjacent a narrowed channel portion, and wherein the deformable, resilient coupling assembly includes portions configured to frictionally engage the enlarged central space and the narrowed channel portion of the coupling portion.

16. A mechanical coupling according to claim 15, wherein the deformable, resilient coupling assembly extends beyond a perimeter of the enlarged central space of the coupling portion.

17. A mechanical coupling according to claim 15, further comprising a passageway formed in the deformable, resilient coupling assembly and a fastener element disposed therethrough.

18. The attachment device of claim 17, the deformable, resilient coupling assembly further comprising a stop element for limiting a travel of the fastener element.

19. A method of selectively coupling and releasing a cleaning assembly from a surface maintenance vehicle, said method comprising:

provisioning an open-ended mounting structure to the surface maintenance vehicle, wherein the open-ended mounting structure has a major interior space adjacent a narrow opening, said major interior space opening through the narrow opening in a direction substantially opposite a predetermined direction of vehicle motion;

engaging at least a portion of the open-ended mounting structure with a deformable, resilient member, wherein at least a portion of said deformable, resilient member is positioned within the major interior space;

operating the surface maintenance vehicle upon a floor surface;

contacting the cleaning assembly with an obstruction on the floor surface; and releasing the cleaning assembly from the vehicle by passing the portion of the deformable, resilient member through the narrow opening in a direction substantially opposite the direction of vehicle motion.

* * * * *